W. NICKLIN.
Improvement in Fruit-Boxes.
No. 129,047. Patented July 16, 1872.
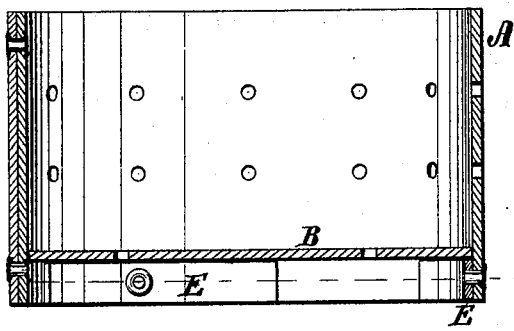
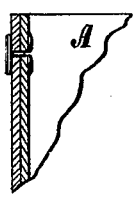
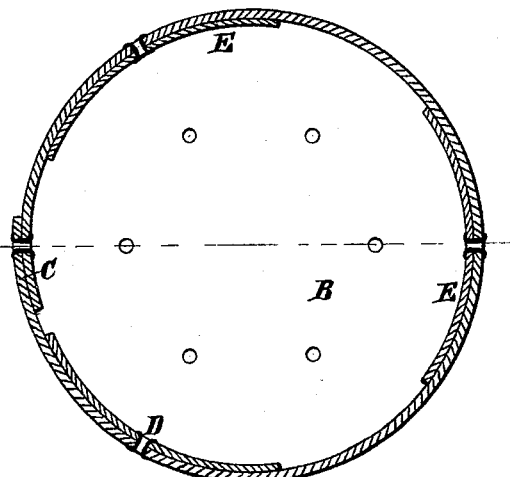
Witnesses:
A Bennerkendorf.
W. A. Graham.
Inventor:
Wm Nicklin.
Per Munn & Co
Attorneys.

129,047

UNITED STATES PATENT OFFICE.

WILLIAM NICKLIN, OF MARLBOROUGH, NEW YORK.

IMPROVEMENT IN FRUIT-BOXES.

Specification forming part of Letters Patent No. 129,047, dated July 16, 1872.

Specification describing a new and Improved Fruit-Box, invented by WILLIAM NICKLIN, of Marlborough, in the county of Ulster and State of New York.

The invention consists in a fruit-box, constructed substantially as hereinafter fully described and pointed out in the claim.

Figure 1 is a sectional elevation of my improved box taken on the line $y\,y$ of Fig. 2. Fig. 2 is a horizontal section on the line $x\,x$ of Fig. 1; and Fig. 3 is a section, showing the application of rivets or tacks for fastening the parts together.

Similar letters of reference indicate corresponding parts.

A represents the hoop or band, consisting of a long rectangular-shaped piece of paste-board suited in length and size to the capacity of the box I want; and B represents the circular disk for the bottom. The said hoop is bent around in a circle and lapped at the ends C, and fastened by eyelets, rivets, tacks, or other equivalent fastening. Care is taken to have the ends lap enough to confine the disk B snugly inside, and it is secured against falling out by the cleats E riveted on the inside of the hoop below it. The said bottom is further secured by paste or glue to the said cleats. Both the hoop and bottom are punched with numerous holes to admit the air, and they are coated with a solution of starch and white-wax or rye-paste to fill the pores, and then varnished with any good thick Dammar or other varnish adapted to resist the water.

Having thus described my invention, I claim as new, and desire to secure by Letters Patent—

As an article of manufacture, a berry-box made of pasteboard by riveting together hoop A, bottom B, and cleats E, as described.

WILLIAM NICKLIN.

Witnesses:
GEORGE ARCHER,
S. H. KNIFFIN.